(12) United States Patent
Murase et al.

(10) Patent No.: US 10,570,518 B2
(45) Date of Patent: Feb. 25, 2020

(54) COMPOSITE PLATING FILM

(71) Applicant: KABUSHIKI KAISHA TOYOTA CHUO KENKYUSHO, Nagakute-shi, Aichi-ken (JP)

(72) Inventors: Masakazu Murase, Nagakute (JP); Riichiro Ohta, Nagakute (JP); Shuxin Dong, Nagakute (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 206 days.

(21) Appl. No.: 15/667,992

(22) Filed: Aug. 3, 2017

(65) Prior Publication Data

US 2018/0037997 A1    Feb. 8, 2018

(30) Foreign Application Priority Data

Aug. 3, 2016   (JP) ................................. 2016-153170

(51) Int. Cl.
*C23C 18/16*    (2006.01)
*B32B 15/01*    (2006.01)
(Continued)

(52) U.S. Cl.
CPC ........ C23C 18/1635 (2013.01); B32B 15/015 (2013.01); C22C 19/00 (2013.01);
(Continued)

(58) Field of Classification Search
CPC ............ C23C 18/1635; C23C 18/1657; C23C 18/1662; C23C 18/1678; C23C 18/32; C23C 19/002; C23C 19/03; C22C 2202/00
See application file for complete search history.

(56) References Cited

U.S. PATENT DOCUMENTS 5,232,744 A    8/1993  Nakamura et al.
5,266,181 A *  11/1993 Matsumura ............ C25D 15/02
                                              205/109
(Continued)

FOREIGN PATENT DOCUMENTS

JP    H02-194197 A    7/1990
JP    H05-148690 A    6/1993
(Continued)

OTHER PUBLICATIONS

Machine Translation of JP 2002061000 via Espacenet (Year: 2002).*
Nov. 19, 2019 Office Action issued in Japanese Patent Application No. 2017-150844.

*Primary Examiner* — Laura C Powers
(74) *Attorney, Agent, or Firm* — Oliff PLC (57) ABSTRACT

An object is to provide a composite plating film excellent in the water-repellent property and oil-repellent property using a material that is less likely to accumulate in the environment, as substitute for a fluorine resin. A composite plating film is provided which includes an alloy matrix phase and a silicone dispersed in the alloy matrix phase. In the composite plating film, the silicone preferably has Hansen solubility parameters comprising a dispersion term $\delta_D$ of 15 $MPa^{1/2}$ or less, a polar term $\delta_P$ of 3 $MPa^{1/2}$ or less, and a hydrogen bonding term $\delta_H$ of 3 $MPa^{1/2}$ or less. The silicone preferably has an interaction radius of a Hansen solubility sphere of 5.0 $MPa^{1/2}$ or less.

11 Claims, 4 Drawing Sheets

(51) Int. Cl.
*C22C 45/04* (2006.01)
*C22C 19/00* (2006.01)
*C22C 19/03* (2006.01)
*C23C 18/32* (2006.01)

(52) U.S. Cl.
CPC ............ *C22C 19/002* (2013.01); *C22C 19/03* (2013.01); *C22C 45/04* (2013.01); *C23C 18/1657* (2013.01); *C23C 18/1662* (2013.01); *C23C 18/1678* (2013.01); *C22C 2202/00* (2013.01); *C23C 18/32* (2013.01)

(56) References Cited

U.S. PATENT DOCUMENTS

| | | | | |
|---|---|---|---|---|
| 5,895,794 A | * | 4/1999 | Berg | ........................ C08J 3/03 523/217 |
| 7,152,526 B2 | * | 12/2006 | Urata | .................... B41F 9/1072 101/157 |
| 2010/0080995 A1 | * | 4/2010 | Ishimatsu | .................. C09J 9/02 428/411.1 |

FOREIGN PATENT DOCUMENTS

| | | |
|---|---|---|
| JP | 2001-49449 A | 2/2001 |
| JP | 2002-061000 A | 2/2002 |

* cited by examiner

COMPOSITE PLATING FILM

TECHNICAL FIELD

The present invention relates to a composite plating film that is excellent in the water-repellent property and oil-repellent property.

BACKGROUND ART

To improve properties of alloy plating films, composite plating films are developed in which fine particles such as resin particles are dispersed in their alloy matrix phases. For example, as described in Patent Literature 1 and 2, composite plating films are known in which fluorine resin particles are dispersed in Ni—P alloy matrix phases. These composite plating films may have, for example, improved water-repellent property and oil-repellent property.

CITATION LIST

Patent Literature

[PTL 1]
JP2001-49449A
[PTL 2]
US5232744B

SUMMARY OF INVENTION

Technical Problem

The composite plating film described in Patent Literature 1, 2 uses a fluorine resin as a material to be dispersed in the alloy matrix, thereby to obtain the high water-repellent property and oil-repellent property. However, environmental accumulation of the fluorine resin is highly possible. When the composite plating film is produced and discarded, therefore, the fluorine resin may be accumulated in the environment to cause the pollution, which is a problem to be solved.

In consideration of the above, the present inventors aim to provide a composite plating film excellent in the water-repellent property and oil-repellent property using a material that is less likely to accumulate in the environment than the fluorine resin,

Solution to Problem

The composite plating film of the present invention includes an alloy matrix phase and a silicone dispersed in the alloy matrix phase, According to the present invention, the silicone, which is less likely to accumulate in the environment, is dispersed in the alloy matrix phase as substitute for the fluorine resin and a composite plating film can thereby be provided which is excellent in the water-repellent property and oil-repellent property.

The silicone is a polymer compound of which the main skeleton is a siloxane as represented by Formula (1) below. In the formula below, side chain groups R1 and R2 each represent a hydrocarbon group or a hydrogen atom.

[Chemical Formula 1]

(1)

In the composite plating film of the present invention, the silicone preferably has a siloxane skeleton of which a side chain group is an alkyl group. When such a silicone is used, a composite plating film can be obtained which is more excellent in the water-repellent property and oil-repellent property.

In the composite plating film of the present invention, the silicone preferably has Hansen solubility parameters comprising a dispersion term $\delta_D$ of 15 MPa$^{1/2}$ or less, a polar term $\delta_P$ of 3 MPa$^{1/2}$ or less, and a hydrogen bonding term $\delta_H$ of 3 MPa$^{1/2}$ or less. The present inventors have found that using the Hansen solubility parameters is effective when selecting a silicone of which the water-repellent property and oil-repellent property are high. The Hansen solubility parameters (HSP), which are physical property values that are used to estimate the solubility of a substance, can be calculated using values of the heat of vaporization, molecular volume, refractive index, and dipole moment of the substance. The smaller the dispersion term $\delta_D$, polar term $\delta_P$, and hydrogen bonding term $\delta_H$ of the Hansen solubility parameters, the fewer types of solvents can be found which are in relation of a high affinity. In the present invention, when the silicone is used of which the dispersion term $\delta_D$, polar term $\delta_P$, and hydrogen bonding term $\delta_H$ of the Hansen solubility parameters are values that satisfy the above, a composite plating film excellent in the water-repellent property and oil-repellent property can be obtained. Moreover, the dispersion term $\delta_D$, polar term $\delta_P$, and hydrogen bonding term $\delta_H$ of the Hansen solubility parameters can be obtained through calculation thereby to select the silicone to be used.

In the composite plating film of the present invention, the silicone preferably has an interaction radius of a Hansen solubility sphere of 5.0 MPa$^{1/2}$ or less. The interaction radius of the Hansen solubility parameters can be obtained through plotting, in a Hansen space, values of the dispersion term $\delta_D$, polar term $\delta_P$, and hydrogen bonding term $\delta_H$ of a solvent of which the Hansen solubility parameters are known and creating a sphere in the Hansen space such that the sphere includes a solvent of which the affinity is determined to be high (i.e. good solvent) and does not include a solvent of which the affinity is determined to be low (i.e. poor solvent). The smaller the interaction radius of the Hansen solubility sphere, the fewer types of solvents can be found which are in relation of a high affinity. In the present invention, when the silicone is used of which the dispersion term $\delta_D$, polar term $\delta_P$, and hydrogen bonding term $\delta_H$ of the Hansen solubility parameters are values that satisfy the above, a composite plating film excellent in the water-repellent property and oil-repellent property can be obtained.

In the composite plating film of the present invention, the silicone preferably comprises particles having a particle size of 10 micrometers or less (in the present description, the particle size refers to a diameter of the particles). The silicone can be readily dispersed in the alloy matrix phase merely by mixing the silicone into a plating bath for the alloy which constitutes the alloy matrix phase and performing the plating using the plating bath in which the silicone is mixed. Specifically the silicone may be, for example, octamethylsilsesquioxane. The octamethylsilsesquioxane is a solid under an ordinary temperature and can thus be formed as particles having a particle size of 10 micrometers or less.

In the composite plating film of the present invention, the silicone contained in the composite plating film preferably has a content ratio of 3.5 mass % or more to the entire composite plating film as a mass percentage of Si atoms that constitute the silicone. This allows the obtained composite plating film to be more excellent in the water-repellent property and oil-repellent property.

In the composite plating film of the present invention, a static contact angle of water on the composite plating film is preferably 100 degrees or more. In the composite plating film of the present invention, a static contact angle of an organic solvent on the composite plating film is preferably 90 degrees or more, provided that the organic solvent has a surface tension of 45 mN/m or more.

In the composite plating film of the present invention, the alloy matrix phase preferably comprises one or more metals selected from Ni, Cu, and Co. These metals act as autocatalyses to allow the alloy matrix phase to be readily formed by electroless plating. The silicone can be readily dispersed in the alloy matrix phase by mixing the silicone into a plating bath used for the electroless plating and performing the electroless plating or the like using the plating bath.

In the composite plating film of the present invention, the alloy matrix phase is preferably a Ni—P alloy matrix phase. When the alloy matrix phase of which the material is a Ni—P alloy having excellent hardness is used, a composite plating film can be obtained which ensures the hardness and which is excellent in the water-repellent property and oil-repellent property.

In the composite plating film of the present invention, a concentration of phosphorus in the Ni—P alloy matrix phase is preferably 5 mass % or more and 11 mass % or less to the entire Ni—P alloy matrix phase. Adjusting the concentration of phosphorus as the above allows a general-purpose composite plating film to be obtained which has both the corrosion resistance and the hardness.

DESCRIPTION OF EMBODIMENTS

<Alloy Matrix Phase>

The composite plating film of the present invention includes an alloy matrix phase and a silicone dispersed in the alloy matrix phase. A large portion of alloy components included in the composite plating film constitutes the alloy matrix phase which is a solid solution that exhibits metallic properties, and other components are dispersed in the alloy matrix phase. The components dispersed in the alloy Matrix phase are referred to as dispersed phases and the silicone according to the present invention is a component that constitutes the dispersed phases.

The alloy matrix phase can be composed of an alloy material that can be formed into a film by plating. The alloy matrix phase preferably comprises one or more metals selected from Ni, Cu, and Co that act as autocatalyses to allow the alloy matrix phase to be readily formed by electroless plating. In particular, it is preferred to use an alloy matrix phase of which the material is a alloy that is excellent in the hardness, and a composite plating film can thereby be obtained which ensures the hardness and which is excellent in the water-repellent property and oil-repellent property. The concentration of phosphorus in the Ni—P alloy matrix phase is preferably 5 mass % or more and 11 mass % or less to the entire Ni—P alloy matrix phase.

<Silicone>

The silicone is a polymer compound of which the main skeleton is a siloxane as represented by the above Formula (1). In general, silicone refers to oligomer and polymer that are able to be produced by hydrolyzing silane or the like to generate silanol and dehydrating and condensing the silanol. Various types of silicone are commercially available. Silicone is widely used in the industrial fields and, in particular, extensively applied to food additives, equipment for foods, cosmetic products, medical drugs and equipment, and the like after the safety assessment and necessary approval. When the silicone, which is less likely to accumulate in the environment than the fluorine resin, is dispersed in the alloy matrix phase, the composite plating film excellent in the water-repellent property and oil-repellent property can be provided. The content ratio of silicone contained in the composite plating film is preferably 3.5 mass % or more and more preferably 20 mass % or more to the entire composite plating film as a mass percentage of Si atoms that constitute the silicone. Silicone that exists as a solid or liquid under an ordinary temperature can be suitably used. Silicone of a solid under an ordinary temperature can be mixed as particles into the plating bath. Particle-like silicone can be dispersed in the alloy matrix phase through preparing a plating liquid for composite plating in which silicone is mixed as particles in a plating bath capable of film formation of an alloy matrix and using the plating liquid for composite plating to perform a plating process in a similar method to the method of forming the alloy matrix by plating. The particle size (maximum value) of the silicone is preferably 20 micrometers or less. In the present description, the "particle size" refers to a diameter. The diameter as used in the present description refers to a maximum length of particles that are present within a field of view when observed using a microscope.

<Hansen Solubility Parameters>

The Hansen solubility parameters, which are obtained by dividing a solubility parameter derived from the regular solution theory of Hildebrand into three components of a dispersion term $\delta_D$, polar term $\delta_P$, and hydrogen bonding term $\delta_H$, can be calculated using values of the heat of vaporization, molecular volume, refractive index, and dipole moment of a substance. The Hansen solubility parameters and the solubility parameter of Hildebrand are in a relationship of $\delta_{tot}^2 = \delta_D^2 + \delta_P^2 + \delta_H^2$. The smaller the dispersion term $\delta_D$, polar term $\delta_P$, and hydrogen bonding term $\delta_H$ of the Hansen solubility parameters, the fewer types of solvents can be found which are in relation of a high affinity. In addition, the smaller the interaction radius of the Hansen solubility sphere, the fewer types of solvents can be found which are in relation of a high affinity. The present inventors have found a method of selecting a silicone excellent in the water-repellent property and oil-repellent property by checking the Hansen solubility parameters of the silicone. Values listed in literature may be used as the values of the Hansen solubility parameters, or values calculated using the commercially available Hansen solubility parameters calculation software (such as HSPiP: Hansen Solubility Parameters in Practice, for example) may be used as the values of the Hansen solubility parameters. Table 1 below lists specific examples of silicones that can be suitably used in the present invention, together with the Hansen solubility parameters and the forms of the silicones under an ordinary temperature. The unit of numerical values listed in Table 1 is $MPa^{1/2}$. In Table 1, the values of Hansen solubility parameters of polydimethylsiloxane are calculated values using the HSPiP while the values of other substances are literature values (source: Hansen Solubility Parameters: A user's handbook, 2nd ed., CRC Press. (2007)). The silicone preferably has Hansen solubility parameters comprising a dispersion term $\delta_D$ of 0 $MPa^{1/2}$ or more and 15 $MPa^{1/2}$ or less, a polar term $\delta_P$ of 0 $MPa^{1/2}$ or more and 3 $MPa^{1/2}$ or less, and a hydrogen bonding term $\delta_H$ of 0 $MPa^{1/2}$ or more and 3 $MPa^{1/2}$ or less and more preferably has Hansen solubility parameters comprising a dispersion term $\delta_D$ of 0 $MPa^{1/2}$ or more and 13 $MPa^{1/2}$ or less, a polar term $\delta_P$ of 0 $MPa^{1/2}$ or more and 2.5 $MPa^{1/2}$ or less, and a hydrogen bonding term $\delta_H$ of 0 $MPa^{1/2}$ or more and 2 $MPa^{1/2}$ or less. The interaction radius of a Hansen solubility sphere of the silicone is preferably 0 $MPa^{1/2}$ or more and 5.0 $MPa^{1/2}$ or less and particularly preferably 0 $MPa^{1/2}$ or more and 4.5 $MPa^{1/2}$ or less.

TABLE 1

| Substance name | $\delta_D$ | $\delta_P$ | $\delta_H$ | $\delta_{tot}$ | Form under ordinary temp. |
| --- | --- | --- | --- | --- | --- |
| Hexamethyldisiloxane | 12.6 | 2 | 0 | 12.8 | Liquid |
| Octamethyltrisiloxane | 12.2 | 1.8 | 0 | 12.3 | Liquid |
| Decamethyltetrisiloxane | 11.7 | 2.4 | 0 | 11.9 | Liquid |
| Hexamethylcyclotrisiloxane | 12.5 | 1.9 | 2 | 12.8 | Solid |
| Polydimethylsiloxane (PDMS) | 12.9 | 2.2 | 1.7 | 13.2 | Liquid |

EXAMPLES (Film Formation of Composite Plating Film)

A substrate having a mirrored surface of 20 mm square and a thickness of 5 mm was prepared. The material of the substrate was carbon steel S-50C. Octamethylsilsesquioxane (part number 526835 available from Sigma-Aldrich) was used as silicone particles. The octamethylsilsesquioxane had Hansen solubility parameters comprising a dispersion term $\delta_D$ of 10.6 $MPa^{1/2}$, a polar term $\delta_P$ of 2.7 $MPa^{1/2}$, and a hydrogen bonding term $\delta_H$ of 2.9 $MPa^{1/2}$ and an interaction radius of a Hansen solubility sphere of less than 4.5 $MPa^{1/2}$. The particle size (diameter) of the particles was 10 micrometer or less as measured by microscopic observation.

TABLE 2

| Component name and conditions | Component concentration and conditional values |
| --- | --- |
| Nickel sulfamate | 20.0 g/L |
| Sodium hypophosphite | 20.0 g/L |
| Disodium citrate | 10.0 g/L |
| Lactic acid | 30.0 g/L |
| Propionic acid | 2.0 g/L |
| Brightening agent | 1.0 g/L |
| pH adjuster | 10.0 g/L |
| Silicone fine particles | 1.0 g/L |
| Cationic surfactant | 0.4 g/L |
| pH | 5.0 |
| Treatment temperature | 80-85° C. |

Figure 1:
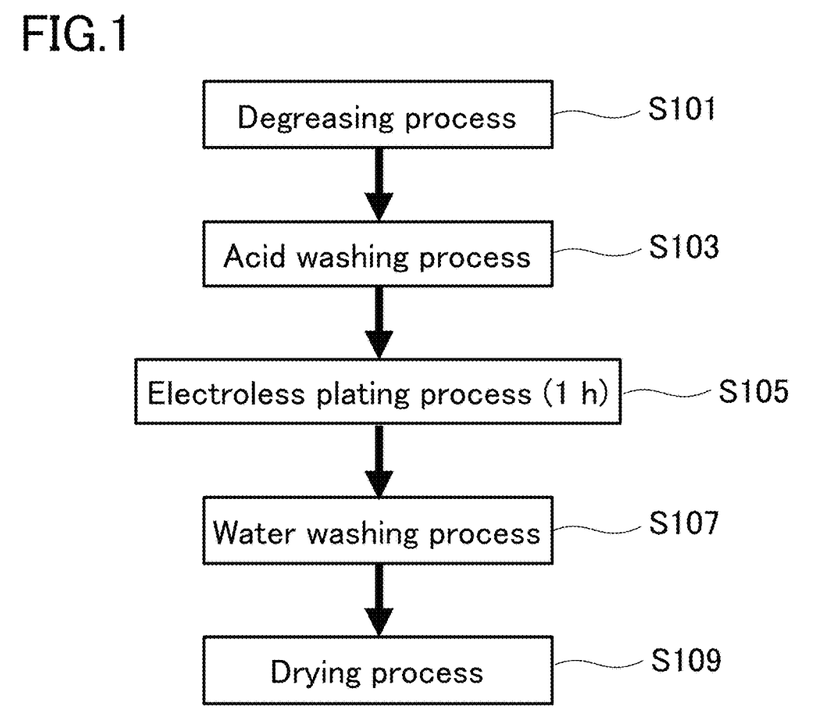
FIG. 1 is a flowchart illustrating a production flow for a composite plating film in an example.

In the example, a composite plating film was produced along a production flow illustrated in FIG. 1. The substrate was degreased first using acetone in a degreasing process (step S101) and then acid washed using sulfuric acid in an acid washing process (step S103). Then, in an electroless plating process, the substrate was immersed in a plating bath listed in Table 2 and the plating process was performed for one hour while maintaining the plating bath temperature at 80 to 85 degrees C. (step S105). Thereafter, the substrate was washed in a water washing process (step S107) and dried in a drying process by vigorously blowing air to the substrate and the plating film to remove water (step S109). Thus, the composite plating film was formed on the substrate.

(Analysis of Composite Plating Film)

Figure 2:
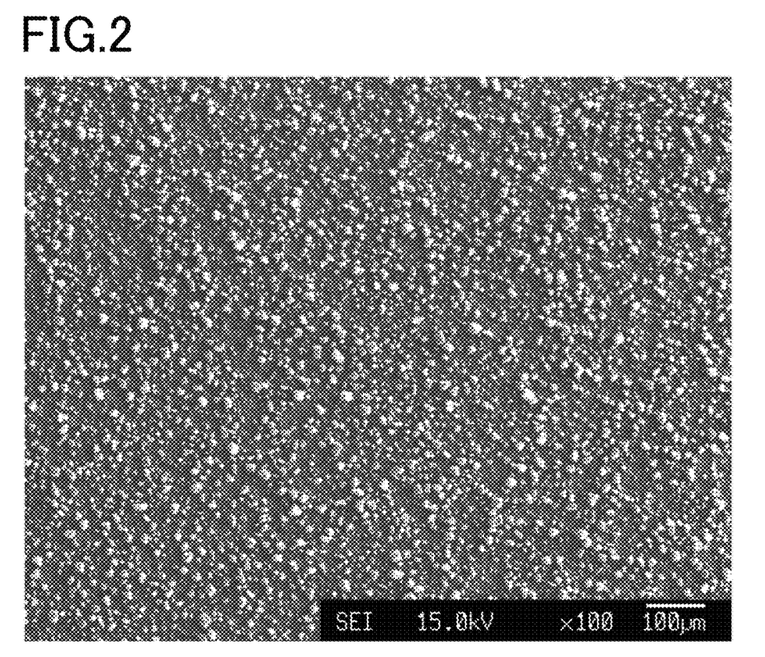
FIG. 2 is a SEM image of the surface of a composite plating film in an example.

FIG. 2 illustrates a SEM image of the surface of the composite plating film after film formation. The black portion seen in FIG. 2 represents a Ni—P alloy matrix phase while the white portions seen in FIG. 2 represent silicone particles. It has been found from FIG. 2 that the silicone particles are homogeneously dispersed in the composite plating film.

Figure 3:
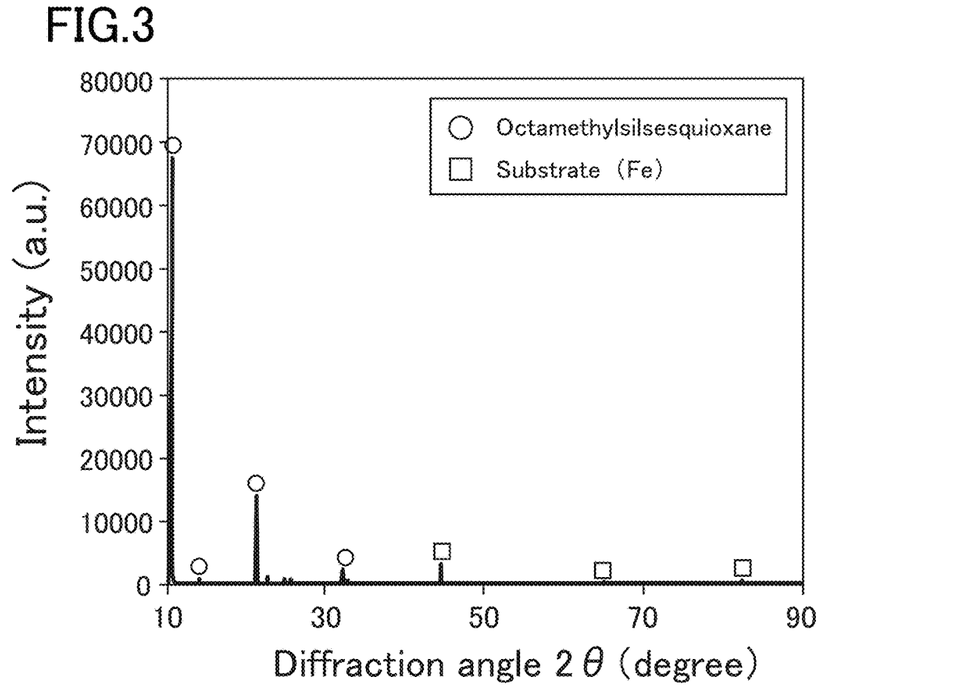
FIG. 3 is a chart illustrating a result of X-ray diffraction of a composite plating film in an example.
Figure 4:
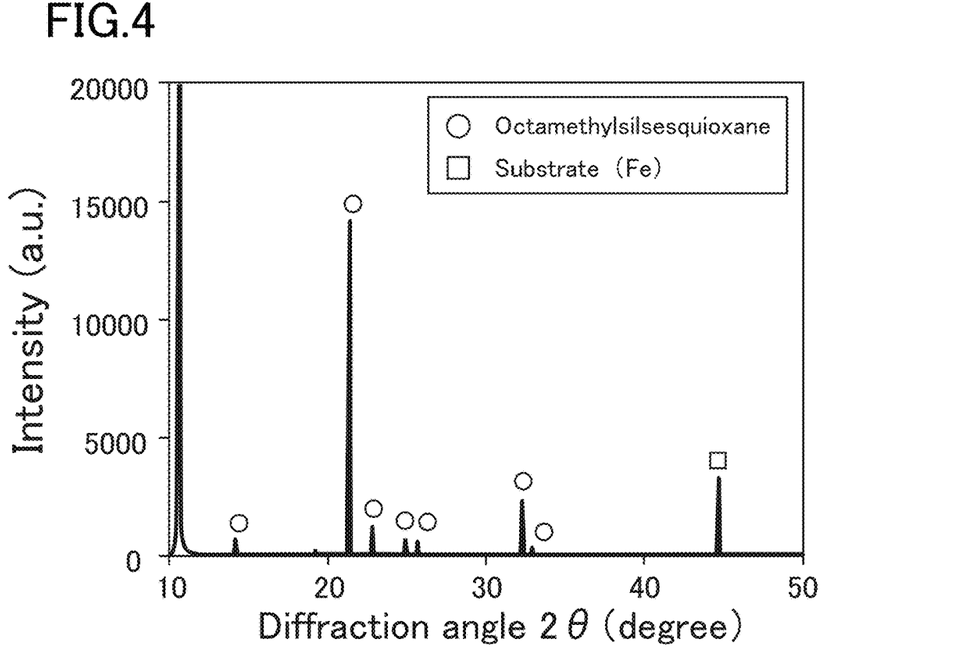
FIG. 4 is an enlarged chart of part of FIG. 3.

FIGS. 3 and 4 illustrate a result of analysis of the composite plating film after film formation using X-ray diffraction. As illustrated in FIGS. 3 and 4, peaks originated from octamethylsilsesquioxane were observed. It has thus been confirmed that octamethylsilsesquioxane used as the raw material exists in the composite plating film after film formation. It is to be noted that peaks originated from iron of the substrate were observed while no peaks of nickel and a nickel-phosphorus compound were observed. This appears to be because the Ni—P alloy is in an amorphous state in this stage.

Table 3 lists a result when performing semi-quantitative analysis on the composite plating film using an electron probe micro analyzer. The content ratio of silicone contained in the composite plating film was 26 mass % or more to the entire composite plating film as a mass percentage of Si atoms constituting the silicone. The mass percentage of P atoms in the alloy matrix was 8.6 mass %.

TABLE 3

| | Element | | | | |
| --- | --- | --- | --- | --- | --- |
| | C | O | Si | P | Ni |
| Mass % | 13.9 | 20.2 | 26.6 | 3.4 | 36.0 |

(Measurement of Static Contact Angle)

Water or a solvent was dropped on the surface of the composite plating film and a static contact angle of the water or solvent on the composite plating film was measured. The measurement was performed such that liquid drops were dropped on five locations of the surface of the specimen to sample five measurement values, which were then averaged to obtain measurement results. Table 4 lists the measurement results together with standard deviation values in the measurement of the contact angle. Conventionally-known films were prepared as comparative examples: a composite nickel-phosphorus alloy film codeposited with fine particles of polytetrafluoroethylene (PTFE); and a PTFE plate material. The static contact angle of water or a solvent with each comparative example was also measured. Results are listed in Table 5. With regard to water and diiodomethane, the composite plating film of the present example exhibited the highest contact angle. The static contact angle of water on the composite plating film was a considerably high value of 100 degrees or more. With regard to ethylene glycol, the composite plating film of the present example exhibited a higher contact angle value than that of the composite nickel-phosphorus alloy film codeposited with fine particles of PTFE, but a lower value than that of the PTFE plate material. It has thus been found that, even though the composite plating film of the present example does not use a fluorine resin, the composite plating film has the water-repellent property and oil-repellent property which are comparable with those of the conventional composite plating film using a fluorine resin. In consideration that the surface tension of diiodomethane and ethylene glycol is about 45 to 50 mN/m, therefore, the static contact angle of an organic solvent having surface tension of 45 mN/m or more on the composite plating film is estimated to be 90 degrees or more.

TABLE 4

| Liquid name | Surface tension (mN/m) | Static contact angle (deg.) | S.D. |
|---|---|---|---|
| Water | 72.8 | 138.1 | 1.5 |
| Diiodomethane | 50.8 | 94.6 | 1.0 |
| Ethylene glycol | 47.7 | 99.1 | 5.3 |

TABLE 5

| Sample for contact angle measurement | Static contact angle (deg.) | | |
|---|---|---|---|
| | Water | Dilodomethane | Ethylene glycol |
| Film of the present invention | 138.1 | 94.6 | 99.1 |
| Electroless Ni—P/PTFE composite plating film | 115.1 | 83.2 | 93.8 |
| PTFE plate | 110 | 85.9 | 104.9 |

(Sintering of Composite Plating Film)

Figure 5:
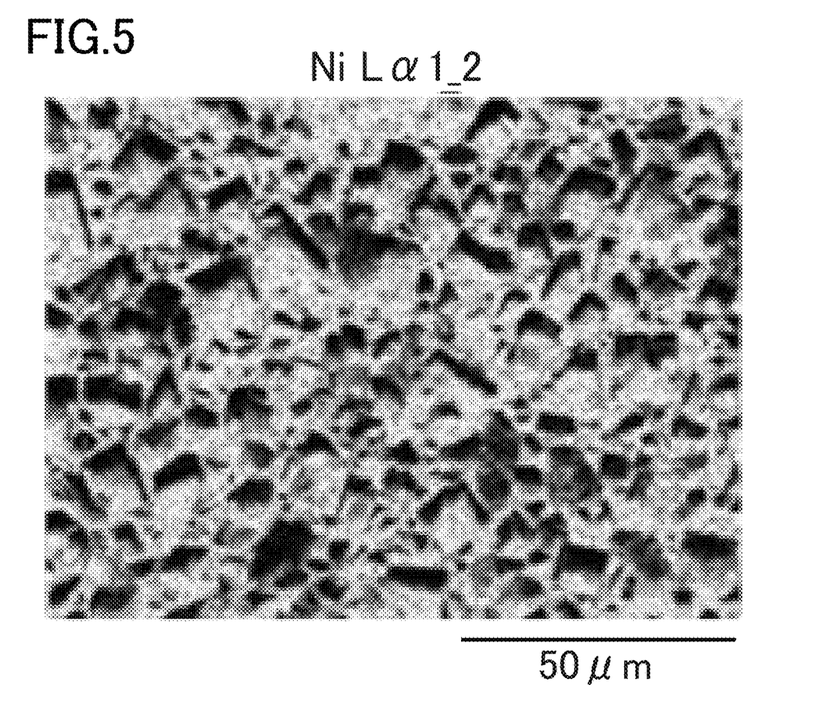
FIG. 5 is a view illustrating a result of analyzing Ni element at the surface of a composite plating film in an example using energy dispersive X-ray spectroscopy.
Figure 6:
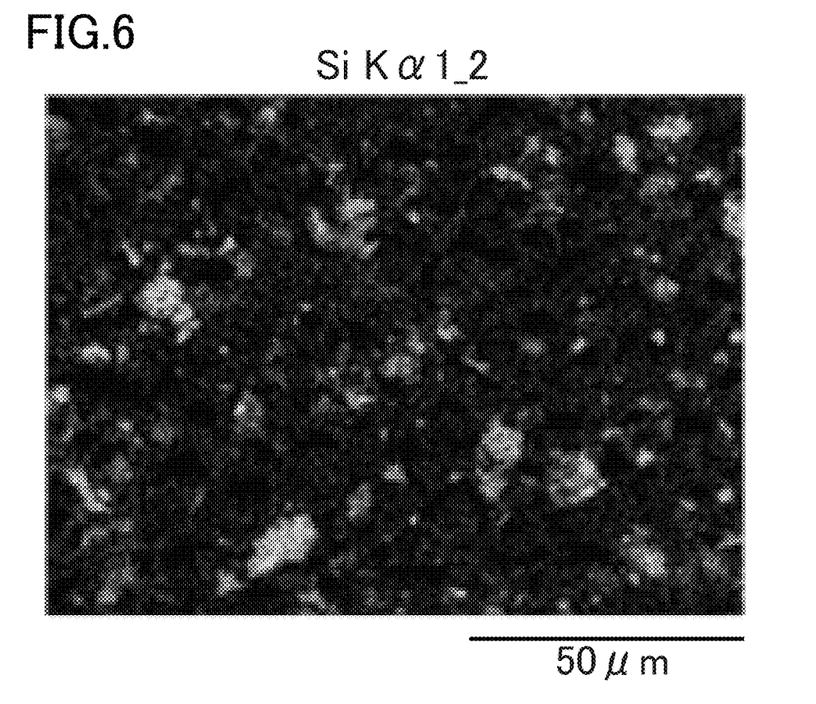
FIG. 6 is a view illustrating a result of analyzing Si element at the surface of a composite plating film in an example using energy dispersive X-ray spectroscopy.

Then, the Vickers hardness of composite plating films after film formation was measured and the composite plating films were thereafter sintered at 300 degrees C., 350 degrees C., and 400 degrees C. FIGS. 5 and 6 illustrate results of analyzing the composite plating film after the sintering at 300 degrees C. using an electron probe micro analyzer. As illustrated in FIG. 6, it has been confirmed that, even after the sintering, the octamethylsilsesquioxane used as the raw material exists in the composite plating film after film formation.

Water was dropped on the surfaces of the composite plating films sintered at 300 degrees C., 350 degrees C., and 400 degrees C. and a static contact angle of the water on the composite plating films was measured. The measurement was performed such that liquid drops were dropped on five locations of the surface of the specimen to sample five measurement values. Numerical value ranges of the measurement values are listed in Table 6. The composite plating film thermally treated at 300 degrees C. exhibited a value of static contact angle of 110 degrees or more, which was higher than those of the other composite plating films after sintering. Moreover, the composite plating film thermally treated at 300 degrees C. exhibited a value of static contact angle of 150 degrees or more depending on the measurement location, and the water-repellent property was thus very high.

TABLE 6

| Thermal treatment temperature | Contact angle of water drop (deg.) |
|---|---|
| 300° C. | 112.3~>150 |
| 350° C. | 89.6~>150 |
| 400° C. | 94.1~>150 |

As described above, it has been found that a composite plating film excellent in the water-repellent property and oil-repellent property can be obtained by dispersing octamethylsilsesquioxane as the silicone in the Ni—P alloy matrix phase according to the present example. In consideration that the octamethylsilsesquioxane has Hansen solubility parameters comprising a dispersion term $\delta_D$ of 10.6 MPa$^{1/2}$ or less, a polar term $\delta_P$ of 2.7 MPa$^{1/2}$ or less, and a hydrogen bonding term $\delta_H$ of 2.9 MPa$^{1/2}$ or less and an interaction radius of a Hansen solubility sphere of less than 4.5 MPa$^{1/2}$, for obtaining a composite plating film excellent in the water-repellent property and oil-repellent property, it is preferred to select a silicone that has Hansen solubility parameters comprising a dispersion term $\delta_D$ of 15 MPa$^{1/2}$ or less, a polar term $\delta_P$ of 3 MPa$^{1/2}$ or less, and a hydrogen bonding term $\delta_H$ of 3 MPa$^{1/2}$ or less and it is more preferred to select a silicone that has, in addition to the above, an interaction radius of a Hansen solubility sphere of 5.0 MPa$^{1/2}$ or less.

(Study on Plating Conditions)

Figure 7:
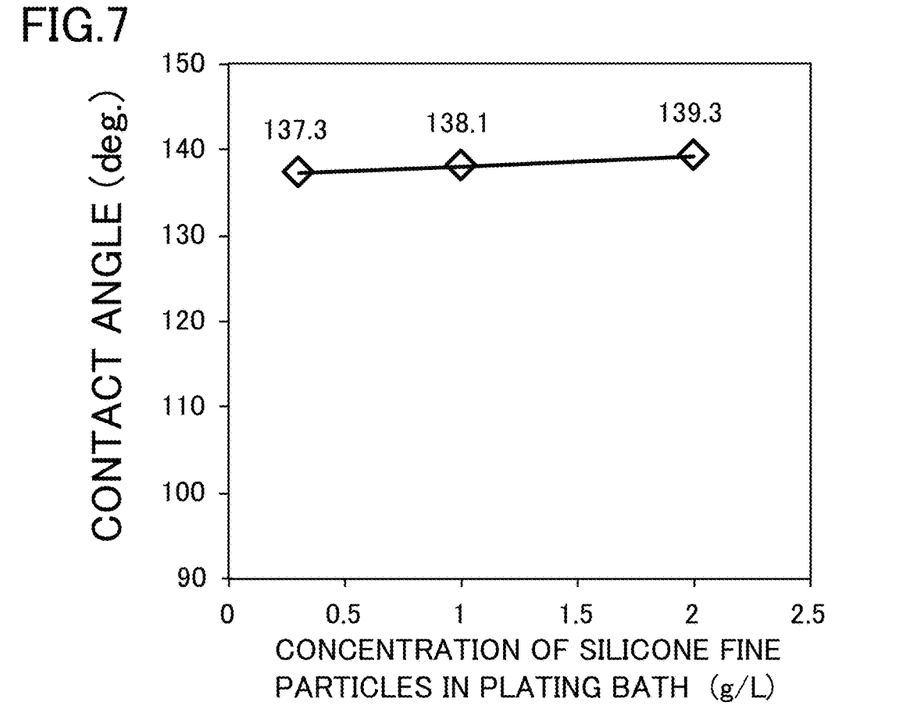
FIG. 7 is a graph illustrating a relationship between a concentration of silicone contained in a plating bath used in an electroless plating process according to an embodiment and a static contact angle of water on a composite plating film.

Processing conditions in the electroless plating process were studied. Plating baths were prepared in which the concentration of silicone fine particles was changed to 0.3 g/L and 2.0 g/L with respect to the plating bath of Table 2. After the production flow illustrated in FIG. 1 was performed using these plating baths, semi-quantitative analysis was performed on each composite plating film to measure the content ratio of Si atoms and other atoms contained in the composite plating film. Results are listed in Table 7. The static contact angle of water on each composite plating film was also measured. Results are illustrated in FIG. 7. It has been found from Table 7 that the content ratio of Si atoms in the composite plating film is not in proportion to the concentration of silicone fine particles in the plating bath and is approximately at the same level independent of the concentration of silicone fine particles in the plating bath. It has also been found that, as illustrated in FIG. 7, the static contact angle of water on the composite plating film is not in proportion to the concentration of silicone fine particles in the plating bath and is approximately at the same level independent of the concentration of silicone fine particles in the plating bath. It has thus been found that the concentration of silicone fine particles in the plating bath may be sufficient if it is 2 g/L or less because the static contact angle of water on the composite plating film does not substantially vary even when the concentration of silicone fine particles in the plating bath is increased. The concentration of silicone fine particles in the plating bath is preferably 2 g/L or less and more preferably 0.3 g/L or more and 2 g/L or less.

TABLE 7

| Concentration of silicone fine particles in plating bath (g/L) | C (wt %) | O (wt %) | Si (wt %) | P (wt %) | Ni (wt %) |
|---|---|---|---|---|---|
| 0.3 | 13.2 | 19.1 | 26.0 | 3.3 | 38.4 |
| 1.0 | 13.9 | 20.2 | 26.6 | 3.4 | 36.0 |
| 2.0 | 15.6 | 24.5 | 30.6 | 2.3 | 27.1 |

Figure 8:
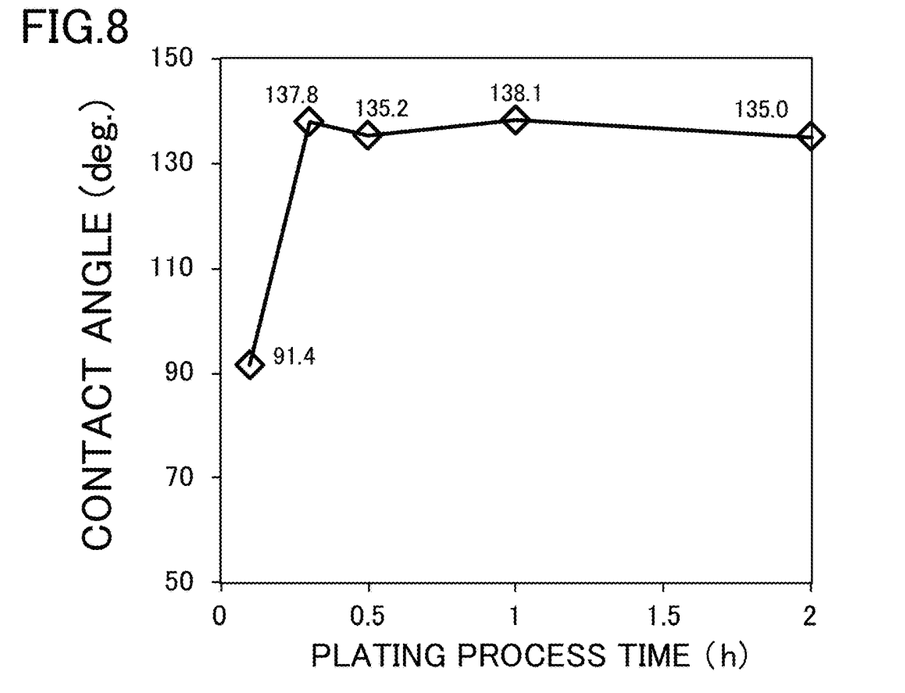
FIG. 8 is a graph illustrating a relationship between a processing time in an electroless plating process according to an embodiment and a static contact angle of water on a composite plating film.

Processing time in the electroless plating process was studied using the plating bath listed in Table 2. The processing time in the electroless plating process was changed between 0.1 hours and 2 hours. After the production flow illustrated in FIG. 1 was performed, semi-quantitative analysis was performed on each composite plating film to measure the content ratio of Si atoms and other atoms contained in the composite plating film. Results are listed in Table 8. The static contact angle of water on each composite plating film was also measured. Results are illustrated in FIG. 8. It has been found from Table 8 and FIG. 8 that, when the processing time is 0.1 hours, the content ratio of Si atoms in the composite plating film is 3.6 mass % and the static contact angle of water on the composite plating film is 91.4 degrees which is higher than the value (54.6 degrees) of static contact angle of water on a Ni—P plating film that contains no silicone fine particles. It has also been found that, when the processing time exceeds 0.3 hours, the content ratio of Si atoms in the composite plating film exceeds 20 mass % and the static contact angle of water on the composite plating film is 130 degrees or more. It has also been found that, when the processing time exceeds 0.3 hours, both the content ratio of Si atoms in the composite plating film and the static contact angle of water on the composite plating film are substantially independent of the processing time and are approximately at constant levels. It has been found that the content ratio of silicone contained in the composite plating film is preferably 3.5 mass % or more and more preferably 20 mass % or more to the entire composite plating film as a mass percentage of Si atoms that constitute the silicone. It has also been found that the processing time of the electroless plating process is preferably 0.1 hours or longer and particularly preferably 0.3 hours or longer.

TABLE 8

| Plating process time (h) | C | O | Si | P | Ni |
|---|---|---|---|---|---|
| 0.1 | 3.8 | 3.7 | 3.6 | 11.1 | 77.7 |
| 0.3 | 10.5 | 14.5 | 20.1 | 5.8 | 49.1 |
| 0.5 | 13.8 | 20.7 | 27.0 | 3.2 | 35.3 |

TABLE 8-continued

| Plating process time (h) | C | O | Si | P | Ni |
|---|---|---|---|---|---|
| 1.0 | 13.9 | 20.2 | 26.6 | 3.4 | 36.0 |
| 2.0 | 13.1 | 19.4 | 25.0 | 4.0 | 38.4 |

The invention claimed is:

1. A composite plating film comprising:
   an alloy matrix phase; and
   a silicone dispersed in the alloy matrix phase, the silicone being selected from the group consisting of octamethylsilsesquioxane, hexamethyldisiloxane, octamethyltrisiloxane, decamethyltetrasiloxane, and hexamethylcyclotrisiloxane,
   wherein the silicone has Hansen solubility parameters comprising a dispersion term $\delta_D$ of 15 MPa$^{1/2}$ or less, a polar term $\delta_P$ of 3 MPa$^{1/2}$ or less, and a hydrogen bonding term $\delta_H$ of 3 MPa$^{1/2}$ or less.

2. The composite plating film as recited in claim 1, wherein the silicone has a siloxane skeleton of which a side chain group is an alkyl group.

3. The composite plating film as recited in claim 1, wherein the silicone has an interaction radius of a Hansen solubility sphere of 5.0 MPa$^{1/2}$ or less.

4. The composite plating film as recited in claim 1, wherein the silicone comprises particles having a particle size of 20 micrometers or less.

5. The composite plating film as recited in claim 1, wherein the silicone is octamethylsilsesquioxane.

6. The composite plating film as recited in claim 1, wherein the silicone contained in the composite plating film has a content ratio of 3.5 mass % or more to the composite plating film as a whole as a mass percentage of Si atoms that constitute the silicone.

7. The composite plating film as recited in claim 1, wherein a static contact angle of water on the composite plating film is 100 degrees or more.

8. The composite plating film as recited in claim 1, wherein a static contact angle of an organic solvent on the composite plating film is 90 degrees or more, wherein the organic solvent has a surface tension of 45 mN/m or more.

9. The composite plating film as recited in claim 1, wherein the alloy matrix phase comprises one or more metals selected from Ni, Cu, and Co.

10. The composite plating film as recited in claim 9, wherein the alloy matrix phase is a Ni—P alloy matrix phase.

11. The composite plating film as recited in claim 10, wherein a concentration of phosphorus in the Ni—P alloy matrix phase is 5 mass % or more and 11 mass % or less to the Ni—P alloy matrix phase as a whole.

* * * * *

UNITED STATES PATENT AND TRADEMARK OFFICE
CERTIFICATE OF CORRECTION

| | | |
|---|---|---|
| PATENT NO. | : 10,570,518 B2 | Page 1 of 1 |
| APPLICATION NO. | : 15/667992 | |
| DATED | : February 25, 2020 | |
| INVENTOR(S) | : Masakazu Murase et al. | |

It is certified that error appears in the above-identified patent and that said Letters Patent is hereby corrected as shown below:

In the Claims

At Column 10, Claim number 1, Line numbers 12 and 13, change:
"octamethyltrisloxane"
To:
-- octamethyltrisiloxane --

Signed and Sealed this
Twelfth Day of May, 2020

Andrei Iancu
*Director of the United States Patent and Trademark Office*